April 18, 1944.   E. DUMONT   2,347,036
PROCESS FOR THE PRODUCTION OF FILAMENTS FROM
MOLTEN THERMOPLASTIC MATERIAL
Filed Aug. 13, 1940

Eugen Dumont
INVENTOR.

BY

HIS ATTORNEYS

Patented Apr. 18, 1944

2,347,036

UNITED STATES PATENT OFFICE 2,347,036

PROCESS FOR THE PRODUCTION OF FILAMENTS FROM MOLTEN THERMOPLASTIC MATERIALS

Eugen Dumont, Troisdorf, near Cologne, Germany; vested in the Alien Property Custodian Application August 13, 1940, Serial No. 352,364
In Germany July 8, 1939

7 Claims. (Cl. 18—54)

This invention relates to the production of shaped structures from reversibly moldable synthetic resins.

It is known that shaped structure can be produced from synthetic resins, for instance polystyrol, polyvinyl carbazole, in such a manner, that for instance by a drawing process these structures show special orientation in one direction only and therefore exhibit special properties with regard to tenacity and pliability.

According to methods hitherto known it was not possible however to produce shaped structures, such as filaments, rods, tubes and the like consisting of preferably linear molecules which exhibit an orientation effect in several directions.

It is an object of the present invention to manufacture shaped structures from reversibly moldable synthetic resins.

A further object is to produce by special mechanical means an orientation effect of the resins in different directions, thereby improving the tenacity of the products.

These and other objects will become apparent from the following specification.

The present invention is based on the observation, that it is possible to manufacture shaped structures, such as filaments, rods, tubes and the like by extruding them in a plastic, molten liquid or dissolved state from a nozzle rotating quickly around its axis, and finally cold drawing said structures in the direction of the extrusion. In this way simply shaped structures such as filaments, rods, tubes and the like show an orientation effect in several directions which greatly improves the tenacity of the product.

The additional drawing of the structure extruded from the nozzle is preferably accomplished in such a manner that the extruded filament is wound up on a cylinder or roll or on other suitable rotating means, the peripheral speed of which, however, is higher than the speed at which the filament is discharged from the nozzle.

The drawing of the filament being extruded from the nozzle may be accomplished according to the present invention also in such a way that the filament is passed between several pairs of rolls or cylinders successively, the speed of rotation of successive pairs of rolls being greater than that of the preceding pair. Repeated drawing occurs hereby wherein the drawing force may gradually decrease from step to step. By these means an enhanced drawing effect of the final product and correspondingly a higher orientation effect is obtained.

Reference is made to the accompanying drawing in which

The filament $c$ consisting of thermoplastic synthetic resins and being extruded from the nozzle $b$ which rotates in the bearings $a$ is wound up in coils on a cylinder $d$. Said cylinder rotates in the bearings $e$ with a higher peripheral speed than the corresponding extrusion velocity.

Figure 1:
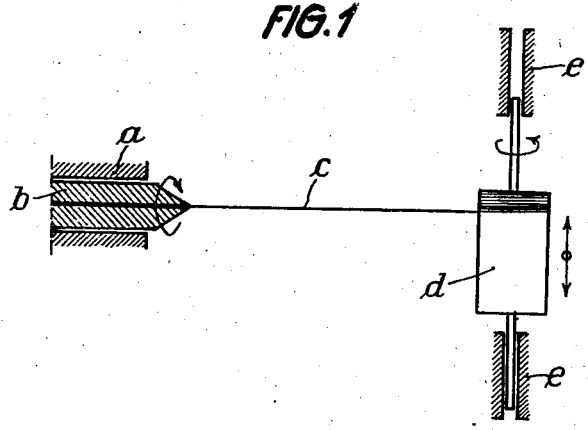
Figure 1 is a diagrammatic view of an extruding device using a cylinder to wind up the filament.
Figure 2:
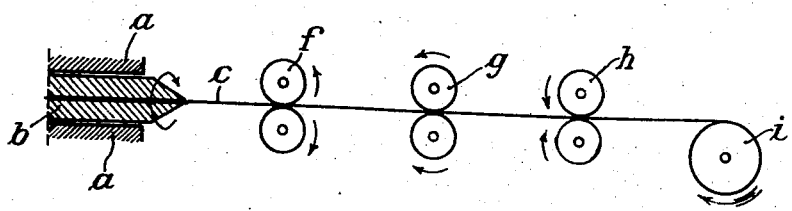
Figure 2 represents mechanical drawing means in which there are used a plurality of cylinder groups, between which the extruded filament passes.

According to Figure 2 the filament $c$ leaves the rotating nozzle $b$, passes in between the cylinder groups $f$, $g$, $h$ and is finally wound up on a roll $i$. These cylinders $f$, $g$, $h$ and the roll $i$ are driven with a peripheral speed increasing from the nozzle-opening towards the cylinder $i$, whereby the peripheral speed of the cylinder $f$ is higher than the extrusion velocity of filament $c$. Gradual drawing of the filament or tube is therefore attained between the nozzle-opening and the cylinder group $f$ as well as between the cylinder groups $f$, $g$, $h$ and the cylinder group $h$ and cylinder $i$. By this drawing action in connection with the torsion caused by the rotating nozzle there is accomplished an orientation effect which is characterized by a considerably improved tenacity of the particular products.

According to the present invention there may be worked up all synthetic resins possessing preferably a linear structure of the polymeric molecules. To these synthetic products there belong especially the polymerisates or interpolymerisates of vinyl chloride, vinyl acetate, vinyl alcohol, vinyl carbazole, maleic acid anhydride and similar compounds. By the present invention there is attained on all these materials an orientation effect which greatly improves their tenacity. This is especially true of the superpoly-condensates which according to this invention represent a most suitable material, such as the superpolyamides and polyamide condensation products which are obtainable either from dibasic acids and diamines or from aminocarboxylic acids and their lactams.

What I claim is:

1. A process for the production of filaments from a molten thermoplastic filament-forming mass comprising the steps of extruding the said mass through an axial orifice of a nozzle which is rotated about its longitudinal axis and which twists the extrudate and then lengthwise cold drawing the twisted extrudate by drawing the same from the said nozzle at a speed greater than the speed at which it is extruded.

2. A process for the production of filaments from a molten thermoplastic filament-forming mass consisting of the steps of extruding the said mass through an axial orifice of a rotating nozzle and stretching the extrudate by cold drawing the same from said nozzle at a speed greater than the speed at which it is extruded by engagement of the extrudate with a cylinder, the peripheral speed of which is greater than the extrusion speed.

3. A process for the production of filaments from a molten thermoplastic filament-forming mass consisting of the steps of extruding the said mass through an axial orifice of a rotating nozzle and stretching the extrudate by cold drawing the same from said nozzle at a speed greater than the speed at which it is extruded by engagement of the extrudate with a cylinder, the peripheral speed of which is greater than the extrusion speed, and then winding the extrudate upon a cylinder having a peripheral speed greater than said first named cylinder.

4. A process for the production of filaments from a molten thermoplastic filament-forming mass consisting of the steps of extruding the said mass through an axial orifice of a nozzle which is rotated about its longitudinal axis and which twists the extrudate and then lengthwise cold drawing the twisted extrudate by passing it between successive pairs of rotating cylinders while insuring engagement of the twisted extrudate with the nips formed by each pair of said cylinders, causing the cylinders of the first pair to rotate at a speed greater than that at which the extrudate is extruded from the nozzle and giving to the cylinders of each succeeding pair a speed of rotation which is greater than that of the cylinders of each preceding pair.

5. The process as defined in claim 1 wherein the thermoplastic filament forming mass is a superpolyamide.

6. The process as defined in claim 1 wherein the thermoplastic filament forming mass is polyvinylchloride.

7. The process as defined in claim 1 wherein the thermoplastic filament forming mass is polyvinylacetate.

EUGEN DUMONT.